United States Patent
Kwon et al.

(10) Patent No.: US 10,762,008 B2
(45) Date of Patent: Sep. 1, 2020

(54) DELAY CIRCUIT AND WRITE AND READ LATENCY CONTROL CIRCUIT OF MEMORY, AND SIGNAL DELAY METHOD THEREOF

(71) Applicant: SK hynix Inc., Icheon-Si (KR)

(72) Inventors: Jung-Hyun Kwon, Seoul (KR);
Do-Sun Hong, Gyeonggi-do (KR);
Won-Gyu Shin, Seoul (KR);
Seung-Gyu Jeong, Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/203,591

(22) Filed: Nov. 28, 2018

(65) Prior Publication Data

US 2019/0188162 A1 Jun. 20, 2019

(30) Foreign Application Priority Data

Nov. 28, 2017 (KR) .......................... 10-2017-0160653

(51) Int. Cl.
*G06F 13/16* (2006.01)
*G06F 3/06* (2006.01)

(52) U.S. Cl.
CPC .......... *G06F 13/1668* (2013.01); *G06F 3/061* (2013.01); *G06F 3/0659* (2013.01); *G06F 3/0673* (2013.01)

(58) Field of Classification Search
CPC .................................................. G06F 13/1668
See application file for complete search history.

(56) References Cited

U.S. PATENT DOCUMENTS

| 10,311,924 B2 * | 6/2019 | Jung ....................... G11C 7/222 |
| 2011/0252164 A1 * | 10/2011 | Grundy ................... G06F 12/06 710/52 |

FOREIGN PATENT DOCUMENTS

| KR | 10-20160117118 | 10/2016 |
| KR | 10-2019-0023796 | 3/2019 |

\* cited by examiner

*Primary Examiner* — Tammara R Peyton
(74) *Attorney, Agent, or Firm* — Perkins Coie LLP

(57) ABSTRACT

A memory module includes a first memory device that includes first circuit nodes for communication with a memory controller and second circuit nodes for communication inside the memory module, a second memory device that includes first circuit nodes for communication with the memory controller and second circuit nodes for communication inside the memory module, and an internal data bus that couples the first memory device to the second memory device to carry data between the second circuit nodes of the first memory device and the second circuit nodes of the second memory device. When an internal read command is applied to the first memory device and an internal write command is applied to the second memory device, data is transferred from the first memory device to the second memory device through the internal data bus.

16 Claims, 11 Drawing Sheets

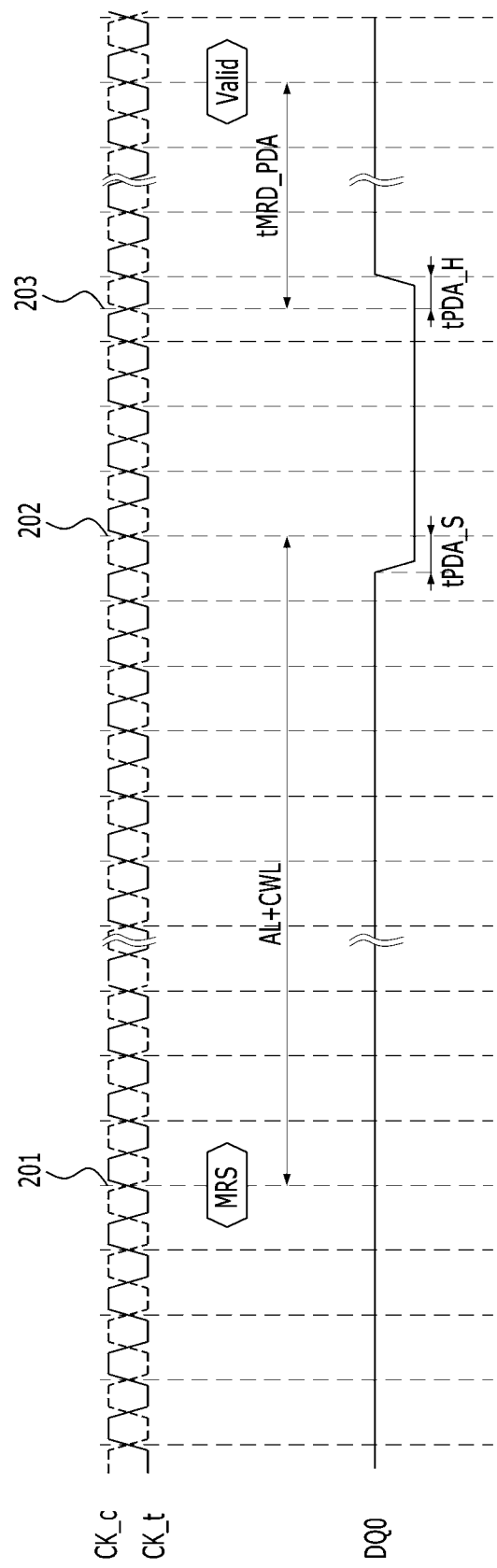

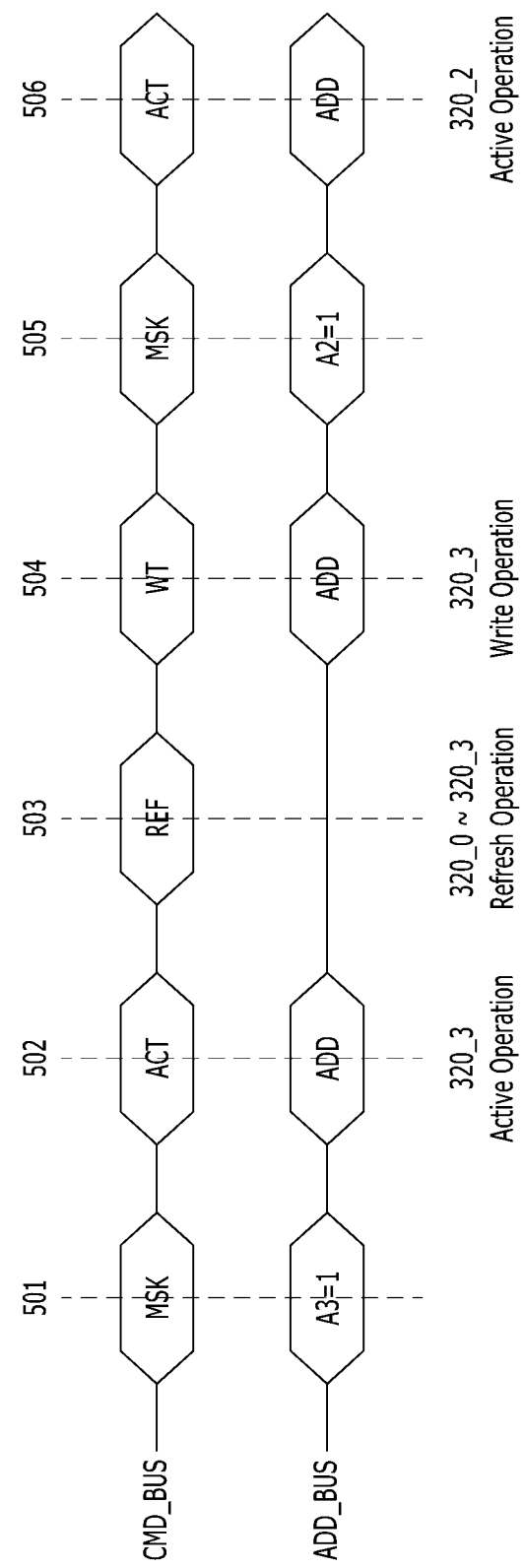

US 10,762,008 B2

DELAY CIRCUIT AND WRITE AND READ LATENCY CONTROL CIRCUIT OF MEMORY, AND SIGNAL DELAY METHOD THEREOF

CROSS-REFERENCE TO RELATED APPLICATIONS

This patent document claims the priority and benefits of Korean Patent Application No. 10-2017-0160653, filed on Nov. 28, 2017, which is incorporated herein by reference in its entirety.

TECHNICAL FIELD

The technology and implementations disclosed in this patent document relate to a memory module and a method for operating the memory module.

BACKGROUND

In various computing devices, systems and applications implementing or using memory for storing digital information, a memory controller may control multiple memory devices connected thereto. The memory controller is connected via internal buses including data buses, address buses, and command buses. The data buses carry data between the memory controller and the multiple memory devices. The address buses and command buses are used to carry address signals and command signals, respectively, from the memory controller to the multiple memory devices.

SUMMARY

This patent document provides, among others, a technology that may directly exchange data between the memory devices in a memory module.

In an embodiment of the disclosed technology, a memory module includes: a first memory device that includes first data pads for communication with a memory controller and second data pads for communication inside the memory module; a second memory device that includes first data pads for communication with the memory controller and second data pads for communication inside the memory module; and an internal data bus suitable for transferring/receiving a data to/from the second data pads of the first memory device and the second data pads of the second memory device, wherein when an internal read command is applied to the first memory device and an internal write command is applied to the second memory device, a data is transferred from the first memory device to the second memory device through the internal data bus.

In another embodiment of the disclosed technology, a memory module includes: a plurality of memory devices; a plurality of data buses that respectively correspond to the memory devices and transfer data between each of the memory devices and a memory controller; an internal data bus suitable for transferring data between the memory devices; and a common command bus and a common address bus suitable for controlling the memory devices, wherein each of the memory devices includes: first data pads coupled to the data buses corresponding thereto; and second data pads coupled to the internal data bus, and when an internal read command is applied to a first memory device among the memory devices through the common command bus and the common address bus and an internal write command is applied to a second memory device, a data is transferred between the first memory device and the second memory device through the internal data bus.

In another embodiment of the disclosed technology, a method for operating a memory module provided with a first memory device and a second memory device includes: receiving a normal read command in the first memory device and the second memory device; transferring a data from the first memory device to a memory controller through a first memory bus and transferring a data from the second memory device to the memory controller through a second memory bus in response to the normal read command; receiving a normal write command in the first memory device and the second memory device; storing the data transferred from the first memory device through the first memory bus and storing the data transferred from the second memory device through the second memory bus in response to the normal write command; receiving an internal read command in the first memory device; receiving an internal write command in the second memory device; and transferring a data from the first memory device to an internal data bus in response to the internal read command and transferring a data from the second memory device to the internal data bus in response to the internal write command.

In another embodiment of the disclosed technology, a memory module includes a first memory device that includes first circuit nodes for communication with a memory controller and second circuit nodes for communication inside the memory module, a second memory device that includes first circuit nodes for communication with the memory controller and second circuit nodes for communication inside the memory module, and an internal data bus that couples the first memory device to the second memory device to carry data between the second circuit nodes of the first memory device and the second circuit nodes of the second memory device. When an internal read command is applied to the first memory device and an internal write command is applied to the second memory device, data is transferred from the first memory device to the second memory device through the internal data bus.

In another embodiment of the disclosed technology, a memory module includes a plurality of memory devices, a plurality of data buses, each of which couples one of the plurality of memory devices to a memory controller to carry data between each of the memory devices and the memory controller, an internal data bus that couples the plurality of memory devices to each other to carry data between the memory devices; a common command bus coupled to and shared by the memory devices to direct a common command signal to each of the memory devices to control the memory devices, and a common address bus coupled to and shared by the memory devices to direct a common address signal to each of the memory devices in connection with the common command signal for an operation at each of the memory devices. Each of the memory devices includes: first circuit nodes coupled to the data buses to carry data signals; and second circuit nodes coupled to the internal data bus to carry data signals. When an internal read command is applied to a first memory device among the memory devices through the common command bus and the common address bus and an internal write command is applied to a second memory device, data is transferred between the first memory device and the second memory device through the internal data bus.

In another embodiment of the disclosed technology, a method for operating a memory module that includes a first memory device and a second memory device is disclosed. The method includes receiving, at the first memory device and the second memory device, a normal read command, transferring a data from the first memory device to a memory controller through a first memory bus and transferring a data from the second memory device to the memory controller through a second memory bus in response to the normal read command, receiving a normal write command in the first memory device and the second memory device, storing the data transferred from the first memory device through the first memory bus and storing the data transferred from the second memory device through the second memory bus in response to the normal write command, receiving, at the first memory device, an internal read command, receiving, at the second memory device, an internal write command, and transferring data from the first memory device to an internal data bus in response to the internal read command and transferring the data from the internal data bus to the second memory device in response to the internal write command.

In another embodiment of the disclosed technology, a method of operating a memory module that includes a plurality of memory devices and an internal data bus carrying data signals between the plurality of memory devices is disclosed. The method includes entering a mode that allows the memory module to select a specific memory device out of a group of memory devices that are selected together in read or write operations, activating a source memory device to load data from the source memory device to the internal data bus, and activating a target memory device to write the data from the internal data bus into the target memory device.

In another embodiment of the disclosed technology, a method of operating a memory module that includes a plurality of memory devices and internal data bus carrying data signals between the plurality of memory devices is disclosed. The method includes setting mode registers for each of the plurality of memory devices to be individually activated by masking undesired memory devices from being activated, masking the plurality of memory devices except for source memory devices that load data stored therein into the internal data bus, and masking the plurality of memory devices except for target memory devices that store the data.

The above and other embodiments or features of the disclosed technology are described in greater detail in the drawings, the description and the claims.

BRIEF DESCRIPTION OF THE DRAWINGS

FIG. 2 is a timing diagram illustrating an example of an operation of a Mode Register Set (MRS) in a Per Dynamic Random Access Memory (DRAM) Addressability (PDA) mode in a memory device.

FIGS. 5A and 5B illustrate an example of a process of step 420 shown in FIG. 4.

DETAILED DESCRIPTION

The disclosed technology can be implemented to provide a memory system that allows a memory module to individually control a plurality of memory devices in the memory module.

Figure 1A:
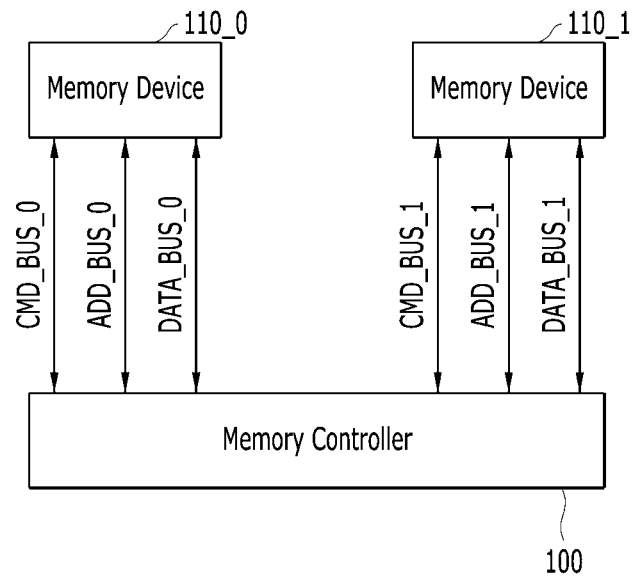
FIGS. 1A and 1B illustrate an example of a bus connection between a memory controller and memory devices.
Figure 1B:
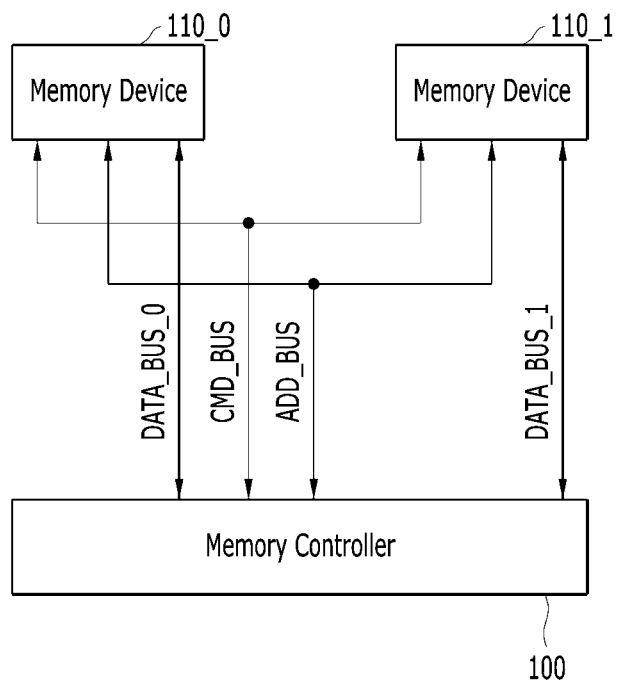

In a memory system where different memory devices are controlled by one memory controller, different interfacing configurations between the memory devices and the memory controller may be implemented. FIGS. 1A and 1B show two examples.

FIG. 1A shows one example of an interface configuration of a memory system in which a memory controller 100 is provided to control two or more memory devices 110_0 and 110_1 via the interface. This example interface configuration includes a first set of interface buses such as a command bus CMD_BUS_0, an address bus ADD_BUS_0, and a data bus DATA_BUS_0 coupled between the memory controller 100 and the first memory device 110_0, and a second set of interface buses such as a command bus CMD_BUS_1, an address bus ADD_BUS_1, and a data bus DATA_BUS_1 coupled between the memory controller 100 and the second memory device 110_1. This example shows an example for certain implementations where the buses coupled between the memory controller 100 and the first memory device 110_0 are separated from the buses coupled between the memory controller 100 and the second memory device 110_1, the memory controller 100 may instruct the first memory device 110_0 and the second memory device 110_1 to perform completely separate operations. For example, a write operation may be performed in the second memory device 110_1 while a read operation is being performed in the first memory device 110_0.

However, some implementations may benefit from sharing one or more interface buses for different memory devices such as devices 100_0 and 100_1 while having one or more non-shared interface buses that are respectively designated for individual memory devices, respectively. The specific sharing design for interface buses (e.g., a command bus, an address bus, or a data bus) for different memory devices is dependent on the needs or requirements of a particular memory system. FIG. 1B illustrates one example of such implementation different from the interface configuration in FIG. 1A. In this example, the first memory device 110_0, which has its own designated data bus DATA_BUS_0, and the second memory device 110_1, which has its own designated data bus DATA_BUS_1, share common command bus CMD_BUS and address bus ADD_BUS so that the first memory device 110_0 and the second memory device 110_1 may simultaneously perform a read operation or simultaneously perform a write operation in response to the same read or write command carried by the shared command bus CMD_BUS while using their designated data buses to read or write different data. Using the same shared address bus, the memory devices may use the same address for their respectively different data locations. Different from FIG. 1A, the two memory devices 110_0 and 110_1 are operated in response to the same command and thus may not perform their separate operations independently. For example, the memory controller 100 may not control a read operation to be performed only in the first memory device 110_0, or may not control a write operation to be performed only in the second memory device 110_1.

A memory rank generally indicates a set of memory chips that are connected to the same chip select and are accessed simultaneously. Some memory control schemes allow programmability of a specific memory chip on a rank by utilizing data strobe signals of each memory chip. For example, Per Dynamic Random Access Memory (DRAM) Addressability (PDA) mode of a memory device can be used to access a specific memory chip instead of accessing all the memory chips in the same memory rank.

FIG. 2 is a timing diagram illustrating an example of an operation of a Mode Register Set (MRS) in a PDA mode in a memory device. In various implementations of the disclosed technology, a memory system or module can control various operating modes of the memory chips therein based on data stored in mode registers. During a setting operation such as mode register set operations, the mode registers may store the data for controlling a certain operating mode.

The PDA mode may support independent mode register set operations. For example, in the PDA mode, a setting operation may be performed on a desired memory chip or mode register rather than all the memory chips in a memory rank. When memory devices are in the PDA mode, the validity of all the mode resister set commands may be determined according to the signal level of a first data pad DQ0 which is a circuit node at which a signal is applied (e.g., a voltage) to represent a desired digital logic level (e.g., "1" or "0"). If the signal level of the first data pad DQ0 is at a logic low level (0) after the period of a write latency (WL=AL+CWL, where AL represents Additive Latency and CWL represents Column Address Strobe [CAS] Write Latency) has passed from application of a mode register set command, the applied mode register set command may be determined to be valid. If the signal level of the first data pad DQ0 is at a logic high level (1), the applied mode register set command may be determined to be invalid, and thus may be ignored.

Referring to FIG. 2, an MRS command is issued at a moment 201. If the signal level of the first data pad DQ0 may transition to the logic low level (0) before a moment 202 when a write latency (WL=AL+CWL) has passed from the moment 201, the mode register set command MRS issued at the moment 201 is determined to be valid, and then a corresponding mode register is loaded with application settings based on an address (not shown) and a mode register set command received during a mode register set command cycle time (tMRD_PDA) from the moment 203.

If the signal level of the first data pad DQ0 is still maintained at the logic high level (1) up until the moment 202, the mode register set command MRS issued at the moment 201 may be determined to be invalid, and thus may be ignored. In other words, the corresponding mode register is not loaded.

Figure 3:
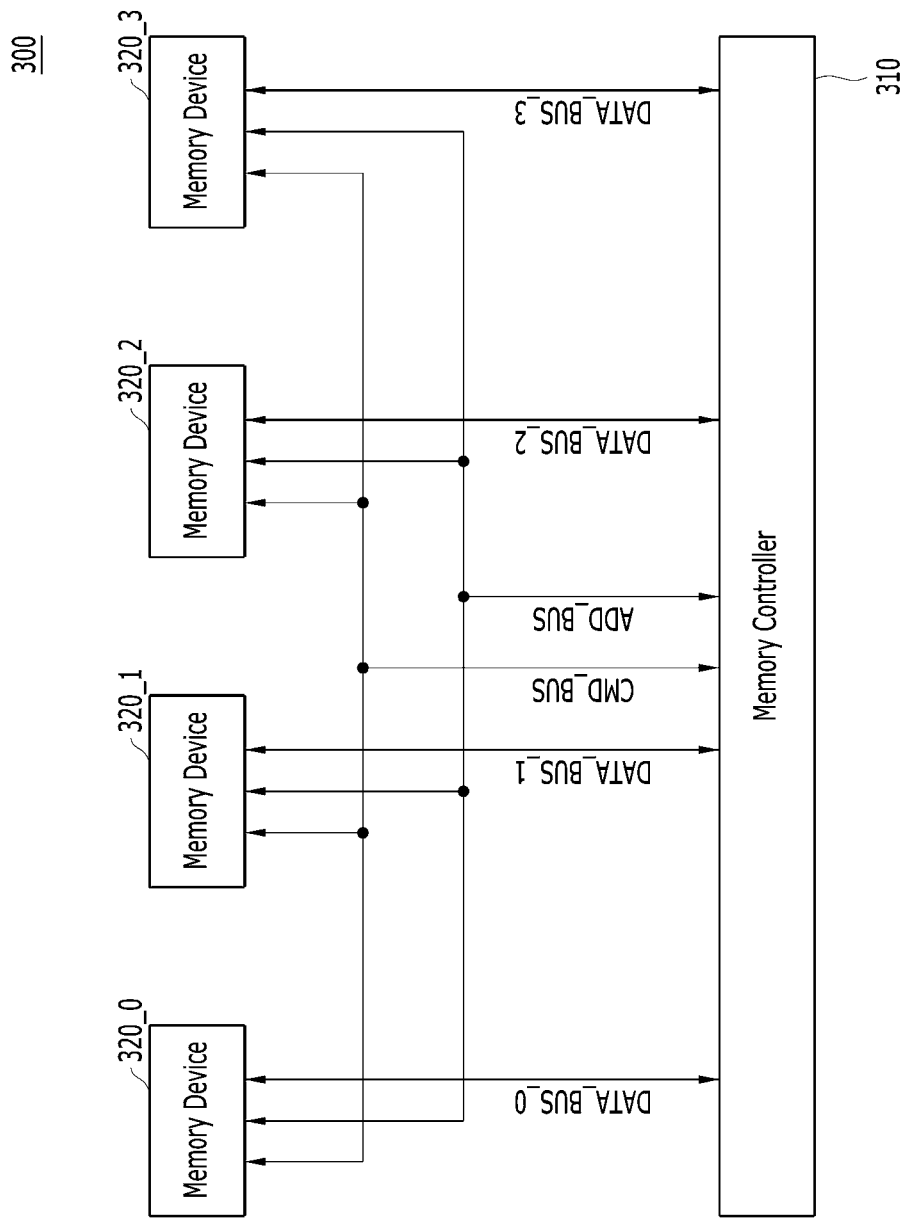
FIG. 3 is a block diagram of an example of a memory system 300 in accordance with an embodiment of the disclosed technology.

FIG. 3 is a block diagram of an example of a memory system 300 in accordance with an embodiment of the disclosed technology.

Referring to FIG. 3, the memory system 300 may include a memory controller 310 and a plurality of memory devices 320_0 to 320_3. Similar to the sharing configuration in FIG. 1B, the plurality of memory devices 320_0 to 320_3 in FIG. 3 may share a command bus CMD_BUS and an address bus ADD_BUS. Also similar to FIG. 1B, the plurality of memory devices 320_0 to 320_3 in FIG. 3 may be coupled to the memory controller via their designated data buses DATA_BUS_0 to DATA_BUS_3, respectively.

The command bus CMD_BUS may be used to carry command signals from the memory controller 310 to the memory devices 320_0 to 320_3. Since the memory devices 320_0 to 320_3 share the command bus CMD_BUS, the same command signals may be fed or transferred to the memory devices 320_0 to 320_4. Examples of the command signals may include an active signal ACT_n, a row address strobe signal RAS_n, a column address strobe signal CAS_n, a write enable signal WE_n, and a chip selection signal CS_n. Additional circuitry such as a buffer circuit may be used for timing adjustment purposes when the command signals are sent on the command bus CMD_BUS.

The address bus ADD_BUS may be used to carry address signals from the memory controller 310 to the memory devices 320_0 to 320_3. Since the plurality of memory devices 320_0 to 320_3 share the address bus ADD_BUS, the same address signals may be fed to the plurality of memory devices 320_0 to 320_3. Examples of the address signals may include a multi-bit bank group address, a multi-bit bank address, and a multi-bit normal address. Additional circuitry such as a buffer circuit may be used for timing adjustment purposes when the address signals are sent on the address bus ADD_BUS.

The data buses DATA_BUS_0 to DATA_BUS_3 may carry multi-bit data between the memory controller 310 and the memory devices 320_0 to 320_3. Since each memory device has its own data bus, the memory devices 320_0 to 320_3 may send/receive different data to/from the memory controller 310.

The memory controller 310 may control the memory devices 320_0 to 320_3 by using the command bus CMD_BUS and the address bus ADD_BUS and exchange data with the memory devices 320_0 to 320_3 through the data buses DATA_BUS_0 to DATA_BUS_3. In an implementation, the memory controller 310 may be included as a part of a processor such as a Central Processing Unit (CPU), a Graphic Processing Unit (GPU), an Application Processor (AP) and the like. In another implementation, the memory controller 310 may be implemented in a memory system or a memory module such as a Dual In-line Memory Module (DIMM). Also, the memory controller 310 may exist in various forms such as a separate chip in an electronic system (e.g., a computing device, a mobile phone, etc.) that includes the memory devices 320_0 to 320_3. In an implementation of the disclosed technology, the memory controller 310 may use a mask command to individually control the memory devices 320_0 to 320_3, which will be described below with reference to FIGS. 4 to 6.

The memory devices 320_0 to 320_3 may share the command bus CMD_BUS and the address bus ADD_BUS. Although the memory devices 320_0 to 320_3 receive the same command signals and address signals from the memory controller 310, the memory devices 320_0 to 320_3 may perform individual operations by using a mask command, which will be shown with reference to FIGS. 4 to 6. Also, although the memory devices 320_0 to 320_3 receive the same command signals and address signals from the memory controller 310, the memory devices 320_0 to 320_3 may perform individual operations by performing a setting operation on a desired memory chip, which will be described below with reference to FIGS. 7 and 8. Each of the memory devices 320_0 to 320_3 may be any type of memory device, such as a DRAM, a Phase Change Random Access Memory (PCRAM), and a flash memory. The memory devices 320_0 to 320_3 may be included in a memory module, such as a dual in-line memory module (DIMM).

Although FIG. 3 shows an example where there are four memory devices 320_0 to 320_3 included in the memory system 300, it is obvious to those skilled in the art that the number of the memory devices included in the memory system 300 may be different.

Figure 4:
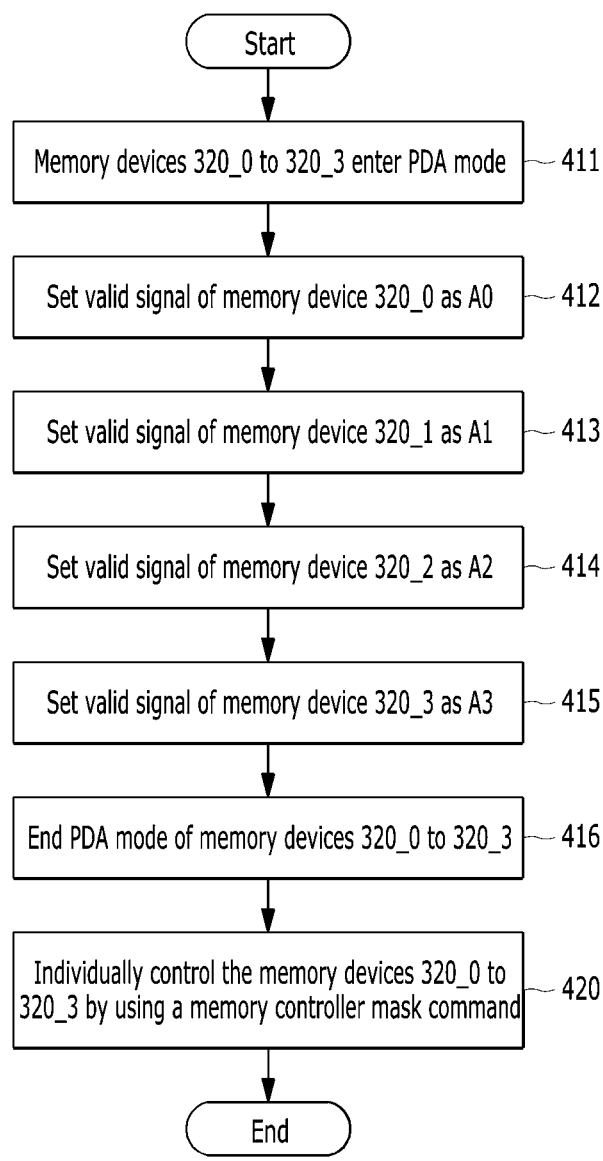
FIG. 4 is a flowchart describing an example of a process of individually controlling memory devices 320_0 to 320_3 by using a mask command in a memory system 300 shown in FIG. 3.

FIG. 4 is a flowchart describing an example of a process of individually controlling the memory devices 320_0 to 320_3 by using a mask command in the memory system 300 shown in FIG. 3.

Referring to FIG. 4, in an implementation of the disclosed technology, the memory controller 310 in the memory system 300 may set interface terminals (e.g., address pin, data pin, etc.) of a desired memory device out of the memory devices 320_0 to 320_3 such that only signals on a particular interface terminal is recognized as valid, and, at step 420, the memory controller 310 individually accesses the memory devices 320_0 to 320_3 320_3. For example, if a certain address bit of a memory device is a "valid" address that is used to select the memory device to execute issued commands, and if the certain address bit of the memory device is "1," the memory device executes the issued commands. Although the corresponding address bit of other memory devices is "1," those memory devices ignore the issued commands because the corresponding address bit is not a valid address for them.

The memory controller 310, at step 411, may control the memory devices 320_0 to 320_3 to enter the Per DRAM Addressability (PDA) mode. This may be carried out by applying, through the command bus CMD_BUS, a combination of the command signals corresponding to the MRS and by applying, through the address bus ADD_BUS, the address signals corresponding to the entering of the PDA mode.

At step 412, the first memory device 320_0 may be set such that a first normal address A0 thereof is recognized as valid by the first memory device 320_0. This may be carried out by applying a combination of the command signals corresponding to the MRS and applying a combination of the address signals such that the first normal address A0 is recognized as valid by the first memory device 320_0. In addition, after a write latency WL has passed from a moment when an MRS command was issued, the first data pad DQ0 of the memory device 320_0 is set to "0" by applying the "0" value to the first data bus DATA_BUS_0. Here, the voltage level of the remaining data buses DATA_BUS_1 to DATA_BUS_3 of the second to fourth memory devices 320_1 to 320_3 remain at low level so that the first data pad DQ0 of the second to fourth memory devices 320_1 to 320_3 are maintained at "1" to prevent the first normal addresses A0 of the second to fourth memory devices from being recognized as valid.

At step 413, a second normal address A1 of the second memory device 320_1 may be set to the predetermined value. At step 414, a third normal address A2 of the third memory device 320_2 may be set to the predetermined value. At step 415, a fourth normal address A3 of the fourth memory device 320_3 may be set to the predetermined value. The processes of the steps 413 to 415 for setting the address pins of the memory devices 320_1 to 320_3 may be performed in the same manner as the step 412 of setting the address pins of the memory device 320_0. In an implementation of the disclosed technology, a particular address is regarded as a "valid signal" for a particular memory device, and the valid signal is used to activate only the desired memory device. Although FIG. 4 shows that the memory devices 320_0 to 320_3 are set such that the first to fourth normal addresses A0 to A3 are the valid signals for the memory devices 320_0 to 320_3 to be individually activated, respectively, the scope of this document is not limited thereto.

After the memory devices 320_0 to 320_3 are set such that a particular address is regarded as the valid signal for each of the memory devices 320_0 to 320_3 to be individually activated, at step 416 the PDA mode may end.

Now, since the memory devices 320_0 to 320_3 are set such that a valid signal of one memory device is different from a valid signal of another memory device, at step 420 the memory controller 310 may individually operate the memory devices 320_0 to 320_3 by using a mask command. The process of the step 420 by which the memory controller 310 individually operates the memory devices 320_0 to 320_3 by using the mask command will be described in detail with reference to FIGS. 5A and 5B.

Various embodiments of the disclosed technology use the mask command to mask some memory devices from executing commands after the mask command is applied. The memory controller 310 may transfer the mask command to the memory devices 320_0 to 320_3 through the command bus CMD_BUS and enable one or more valid signals A0, A1, A2 and A3 of the memory devices 320_0 to 320_3. Here, the "valid" signal may be an address signal that is used to individually activate each memory device. If a memory device activates its valid signal when the mask command is applied, it will recognize the commands transferred following the mask command as valid commands, whereas if a memory device does not activate its valid signal when the mask command is applied, it will not recognize the commands transferred following the mask command as valid commands. For example, when a valid signal A2 is enabled when the mask command is applied from the memory controller 310 to the memory devices 320_0 to 320_3, the commands following the mask command may be executed in the memory device 320_2, but they may not be executed in the memory devices 320_0, 320_1, and 320_3.

Some of the commands following the mask command may be masked by the mask command, but others of the commands are not masked by the mask command. For example, commands for individually controlling memory devices, such as an active command, a precharge command, a read command, and a write command may be masked by the mask command. In an embodiment of the disclosed technology, those commands may be masked by "masking" data from getting written into undesired memory devices or memory cells. For example, this technique may be implemented by using some of data pins as data mask pins. In another embodiment of the disclosed technology, those commands may be masked by masking command signals or address signals from being applied to the undesired memory devices or memory cells. However, commands for continuously retaining data in a memory device, such as a refresh command, commands for setting a memory device, such as an MRS command, and commands for changing a memory device to be masked, such as another mask command, are not masked by the mask command. Here, the types of the commands to be masked are listed for examples only, and the types of the commands to be masked may vary depending on how a system is designed.

In an implementation of the disclosed technology, the mask command may be defined as an unused combination of commands among combinations of command signals. For example, according to a command truth table of JEDEC DDR4 SPEC, a case where a chip selection signal CS_n, an active signal ACT_n, a row address strobe signal RAS_n, a column address strobe signal CAS_n, and a write enable signal WE_n are (L, H, L, H, H) is not defined. This case when these command signals are (L, H, L, H, H) may be defined as a mask command, for example.

Figure 5B:
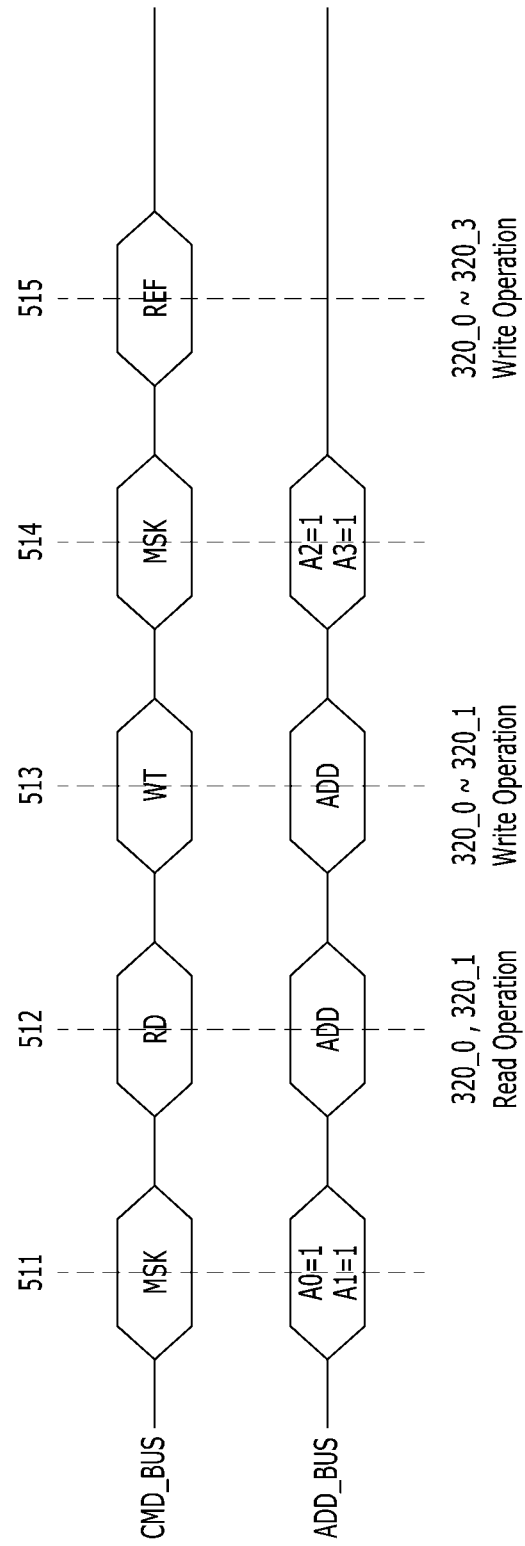

FIGS. 5A and 5B illustrate an example of a process of the step 420 shown in FIG. 4.

Referring to FIG. 5A, a mask command MSK may be applied from the memory controller 310 to the memory devices 320_0 to 320_3 at a moment 501, and the fourth normal address A3, which is the valid signal for the fourth memory devices 320_3 to be individually activated, may have a value of "1." In this way, the first to third memory devices 320_0 to 320_2 excluding the fourth memory device 320_3 may be masked from commands.

An active command ACT may be applied from the memory controller 310 to the memory devices 320_0 to 320_3 at a moment 502, and an address ADD may be applied to select a particular memory location that will become active in response to the active command ACT. In this way, as shown in FIG. 5A, the fourth memory device 320_3 becomes active at 502, whereas the first to third memory devices 320_0 to 320_2 are not activated.

A refresh command REF may be applied from the memory controller 310 to the memory devices 320_0 to 320_3 at a moment 503, for example. Since the refresh command REF is not masked by the mask command, all of the memory devices 320_0 to 320_3 are refreshed.

A write command WT may be applied from the memory controller 310 to the memory devices 320_0 to 320_3 at a moment 504, and an address ADD may be applied to select a particular memory location that will store data. In this way, while a write operation is being performed on the fourth memory device 320_3, the write operation may not be performed on the first to third memory devices 320_0 to 320_2.

A mask command MSK may be applied from the memory controller 310 to the memory devices 320_0 to 320_3 at a moment 505, and the third normal address A2 may have a value of "1." In this way, the first, second, and fourth memory devices 320_0, 320_1 and 320_3 excluding the third memory device 320_2 may be masked from commands. The memory devices masked from the commands by the mask command MSK at the moment 505 may be different from the memory devices masked from the commands by the mask command MSK at the moment 501.

An active command ACT may be applied from the memory controller 310 to the memory devices 320_0 to 320_3 at a moment 506, and an address ADD may be applied to select a particular memory location that will become active in response to the active command ACT. In this way, the third memory device 320_2 becomes active at 506, whereas the first, second, and fourth memory devices 320_0, 320_1 and 320_3 are not activated.

Referring to FIG. 5B, a mask command MSK may be applied from the memory controller 310 to the memory devices 320_0 to 320_3 at a moment 511, and the first normal address A0 and the second normal address A1, which are the valid addresses of the first and second memory devices 320_0 and 320_1, respectively, may have a value of "1." In this way, the third and fourth memory devices 320_2 and 320_3 excluding the first and second memory devices 320_0 and 320_1 may be masked from commands.

A read command RD may be applied from the memory controller 310 to the memory devices 320_0 to 320_3 at a moment 512, and an address ADD may be applied to read out data from a particular memory location that is selected by the address ADD. In this way, while a read operation is being performed on the memory devices 320_0 and 320_1, the read operation may not be performed on the memory devices 320_2 and 320_3.

A write command WT may be applied from the memory controller 310 to the memory devices 320_0 to 320_3 at a moment 513, and an address ADD may be applied to write data on a particular memory location that is selected by the address ADD. In this way, while a write operation is being performed on the memory devices 320_0 and 320_1, the write operation may not be performed on the memory devices 320_2 and 320_3.

A mask command MSK is applied from the memory controller 310 to the memory devices 320_0 to 320_3 at a moment 514, and the third normal address A2 and the fourth normal address A3, which are the valid signals of the third and fourth memory devices 320_2 and 320_3, may have a value of "1." In this way, the first and second memory devices 320_0 and 320_1 excluding the third and fourth memory devices 320_2 and 320_3 may be masked from commands.

A refresh command REF may be applied from the memory controller 310 to the memory devices 320_0 to 320_3 at a moment 515. Since the refresh command REF is not masked by the mask command, all of the memory devices 320_0 to 320_3 are refreshed.

FIGS. 5A and 5B show that it is possible to individually operate the memory devices 320_0 to 320_3 which share the command bus CMD_BUS and the address bus ADD_BUS by using the mask command MSK.

Figure 6:
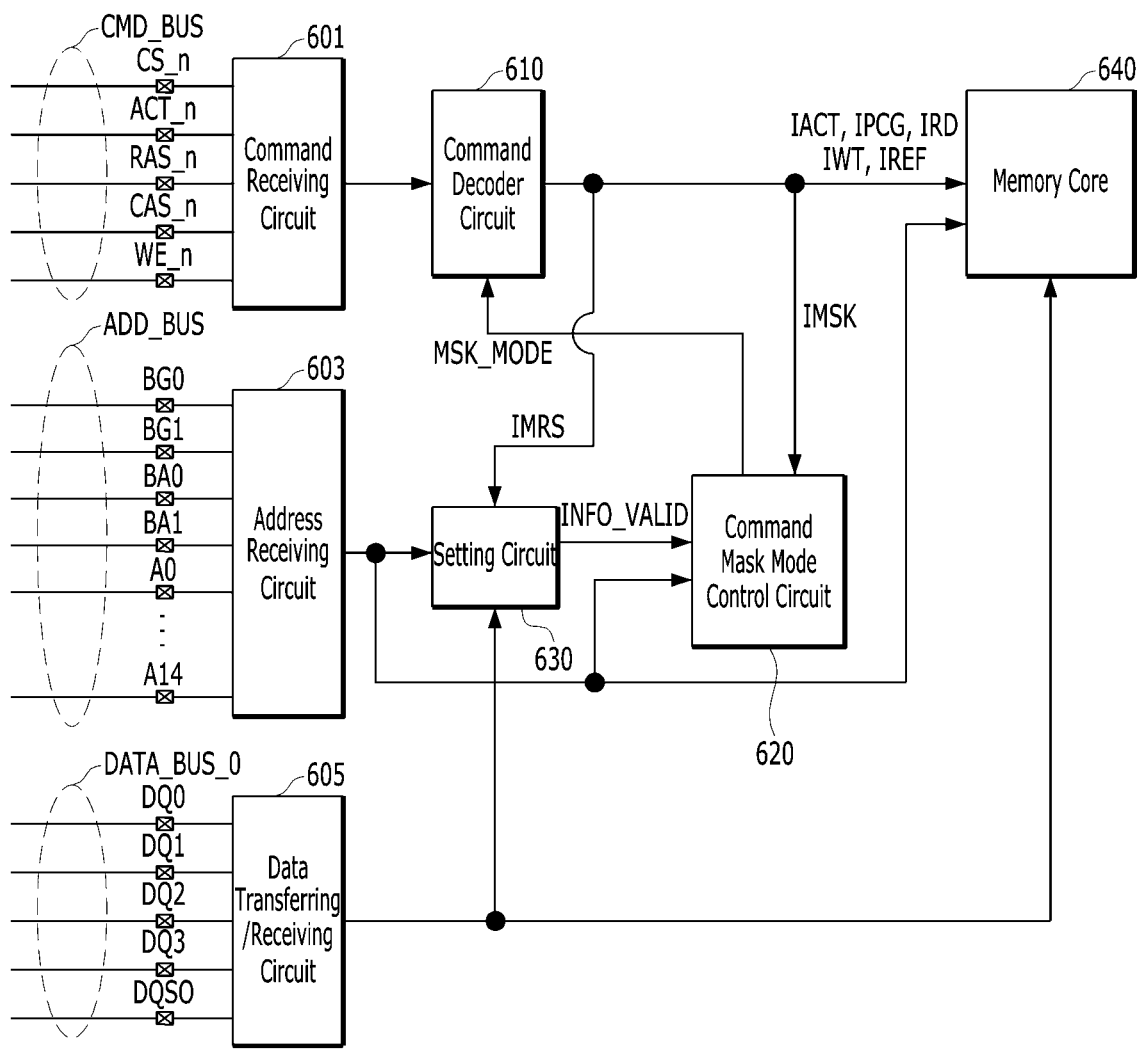
FIG. 6 is a block diagram of an example of a memory device 320_0 shown in FIG. 3.

FIG. 6 is a block diagram of an example of the memory device 320_0 shown in FIG. 3. The memory device 320_0 of FIG. 3 may operate as shown in FIGS. 4 to 5B. The memory devices 320_0 to 320_3 shown in FIG. 3 may be the same as or similar to those shown in FIG. 6.

Referring to FIG. 6, the memory device 320_0 may include a command receiving circuit 601, an address receiving circuit 603, a data transferring/receiving circuit 605, a command decoder circuit 610, a command mask mode control circuit 620, a setting circuit 630, and a memory core 640.

The command receiving circuit 601 may receive command signals transferred from the command bus CMD_BUS to circuit nodes CS_n, ACT_n, RAS_n, CAS_n, and WE_n which are command pads in FIG. 6 since the signal levels at those circuit nodes are digital logic levels of the command signals. In the drawing, the command pads CS_n, ACT_n, RAS_n, CAS_n, and WE_n are represented by the symbols of the command signals received by the corresponding pads. For example, "CS_n" may represent a chip select signal, and "ACT_n" may represent an active signal, and "RAS_n" may represent a row address strobe signal, and "CAS_n" may represent a column address strobe signal.

The address receiving circuit 603 may receive address signals transferred from the address bus ADD_BUS to circuit nodes BG0, BG1, BA0, BA1, and A0 to A14, which are address pads in FIG. 6 since the signal levels at those circuit nodes are digital logic levels of the address signals. In FIG. 6, the address pads BG0, BG1, BA0, BA1, and A0 to A14 are represented by the symbols of the address signals received by the corresponding pads. For example, "BG0" and "BG1" may represent bank group address signals, and "BA0" and "BA1" may represent bank address signals, and "A0" to "A14" may represent address signals.

The data transferring/receiving circuit 605 may transmit/receive data and data strobe signals via the data bus DATA_BUS_0, the data pads DQ0 to DQ3 and the data strobe signal pad DQS0. The data strobe signal may be a strobe signal used by the data transferring/receiving circuit 605 to transmit/receive data.

The command decoder circuit 610 may decode the command signals received by the command receiving circuit 601 to generate internal command signals IACT, IPCG, IRD, IWT, IREF, IMSK and IMRS. The internal command signals IACT, IPCG, IRD, IWT, IREF, IMSK and IMRS may be enabled when the command signals transferred from the command receiving circuit 601 have combinations corresponding to the commands. The internal command signals may include an internal active signal IACT, an internal precharge signal IPCG, an internal read signal IRD, an internal write signal IWT, an internal refresh signal IREF, an internal mask signal IMSK, an internal MRS signal IMRS and the like. The command decoder circuit 610 may decode the command signals in a normal mode to enable the internal command signal corresponding to a combination of command signals among the internal command signals IACT, IPCG, IRD, IWT, IREF, IMSK, and IMRS, but may not enable the internal active signal IACT, the internal precharge signal IPCG, the internal read signal IRD, and the internal write signal IWT in a mask mode in which the mask mode signal MSK_MODE is enabled. In other words, in the mask mode, the internal command signals IACT, IPCG, IRD, and IWT corresponding to the masked command may not be enabled. Even in the mask mode, the internal command signals IREF, IMSK, and IMRS corresponding to unmasked commands may be enabled normally.

In response to the enabling of the internal MRS signal IMRS, the setting circuit 630 may decode an address received by the address receiving circuit 603 and perform various setting operations. The setting circuit 630 may receive the entire part of the address received by the address receiving circuit 603 or may receive only a necessary part of the address. The setting circuit 630 may receive a portion of the data received by the data transferring/receiving circuit 605 to detect the voltage level of the data pad DQ0 in the PDA mode. What signal, among the signals the memory device 320_0 receives, will be used to individually activate the memory device 320_0 may be set by the setting circuit 630, and valid signal information INFO_VALID indicating the signals that are used as the "valid signal" may be provided to the command mask mode control circuit 620.

When the address signal that is used as the valid signal, among the address signals received by the address receiving circuit 603, has a value of "1," while the internal mask signal IMSK is enabled, the mask mode control circuit 620 may control the command decoder circuit 610 in the normal mode. In other words, the mask mode signal MSK_MODE may be maintained in a disabled state. Also, when the address signal that is used as the valid signal, among the address signals received by the address receiving circuit 603, has a value of "0," while the internal mask signal IMSK is enabled, the mask mode control circuit 620 may control the command decoder circuit 610 in the command mask mode. In other words, the mask mode signal MSK_MODE may be enabled. As described above, the command decoder circuit 610 may not enable the masked internal command signals IACT, IPCG, IRD and IWT, when the mask mode signal MSK_MODE is enabled.

The memory core 640 may perform an active operation, a precharge operation, a refresh operation, a read operation, and a write operation, which are main operations of the memory device 320_0. The memory core 640 may include a cell array, a row circuit for controlling an active operation, a precharge operation and a refresh operation of the cell array, and a column circuit for controlling a read operation and a write operation of the cell array. The memory core 640 may perform operations corresponding to the enabled internal command signals among the internal command signals IACT, IPCG, IRD, IWT and IREF. The memory core 640 may receive the address received by the address receiving circuit 603 to perform an operation requiring an address, such as an active operation, a read operation, a write operation and the like. Also, the data that is read from the memory core 640 during a read operation may be read out through the data bus DATA_BUS_0 and the data transferring/receiving circuit 605, and the data to be written to the memory core 640 during a write operation may be received through the data bus DATA_BUS_0 and the data transferring/receiving circuit 605.

Figure 7:
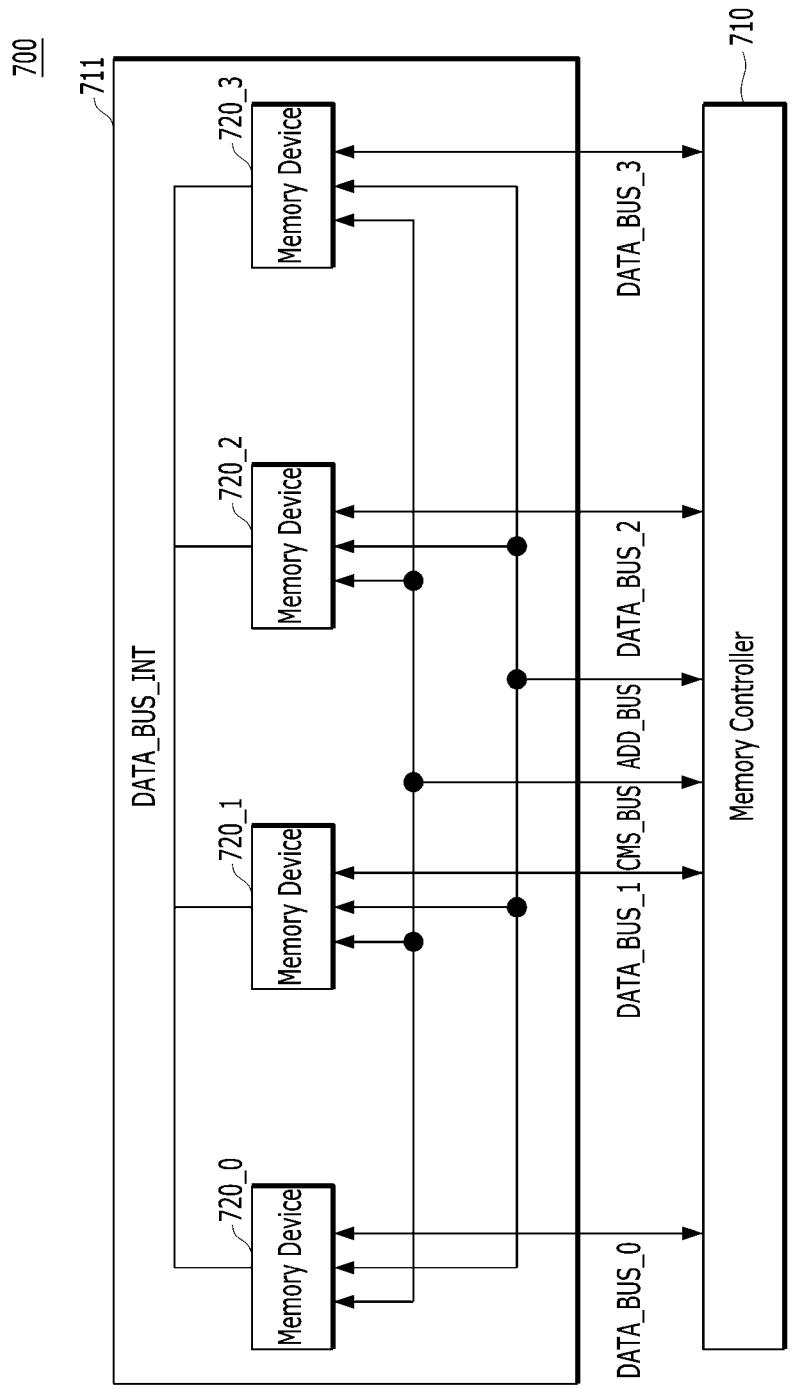
FIG. 7 is a block diagram of an example of a memory system 700 in accordance with another embodiment of the disclosed technology.

FIG. 7 is a block diagram of an example of a memory system 700 in accordance with another embodiment of the disclosed technology.

Referring to FIG. 7, the memory system 700 may include a memory controller 710 and a memory module 711. The memory module 711 may include a plurality of memory devices 720_0 to 720_3. The plurality of memory devices 720_0 to 720_3 may share a command bus CMD_BUS and an address bus ADD_BUS. Also, separate data buses DATA_BUS_0 to DATA_BUS_3 may be allocated to the memory devices 720_0 to 720_3, respectively. In an implementation of the disclosed technology, the memory module 711 may further include an internal data bus DATA_BUS_INT for carrying data between the memory devices 720_0 to 720_3. Here, the internal data bus DATA_BUS_INT may also be shared by the plurality of memory devices 720_0 to 720_3. The memory module 711 may be of a Dual In-line Memory Module (DIMM) type.

The command bus CMD_BUS may be used to carry command signals from the memory controller 710 to the memory devices 720_0 to 720_3. Since the memory devices 720_0 to 720_3 share the command bus CMD_BUS, the same command signals may be fed to the memory devices 720_0 to 720_4. Examples of the command signals may include an active signal ACT_n, a row address strobe signal RAS_n, a column address strobe signal CAS_n, a write enable signal WE_n, and a chip selection signal CS_n. The memory module 711 may further include a buffer circuit for buffering command signals on the command bus CMD_BUS and timing adjustment of the command signals.

The address bus ADD_BUS may be used to carry address signals from the memory controller 710 to the memory devices 720_0 to 720_3. Since the plurality of memory devices 720_0 to 720_3 share the address bus ADD_BUS, the same address signals may be fed to the plurality of memory devices 720_0 to 720_3. Examples of the address signals may include a multi-bit bank group address, a multi-bit bank address, and a multi-bit normal address. Additional circuitry such as a buffer circuit may be used for timing adjustment purposes when the address signals are sent on the address bus ADD_BUS.

The data buses DATA_BUS_0 to DATA_BUS_3 may carry multi-bit data between the memory controller 710 and the plurality of memory devices 720_0 to 720_3. Since each memory device has its own data bus, the plurality of memory devices 720_0 to 720_3 may send/receive different data to/from the memory controller 710. The memory module 711 may further include buffer circuits for buffering data on the data buses DATA_BUS_0 to DATA_BUS_3 and timing adjustment of the data.

The internal data bus DATA_BUS_INT is a data bus for exchanging data between the memory devices 720_0 to 720_3 in the memory module 711 and may be shared by the plurality of memory devices 720_0 to 720_3. The memory devices 720_0 to 720_3 may use the data buses DATA_BUS_0 to DATA_BUS_3 and/or the internal data bus DATA_BUS_INT during a read operation and a write operation. For example, the memory device 720_2 may use the data bus DATA_BUS_2 during the read operation or the write operation to carry data to or from the memory controller 710, and may use the internal data bus DATA_BUS_INT during the read and write operations to carry data to or from another memory device, e.g., the memory device 720_0, in the memory module 711.

The memory controller 710 may control the plurality of memory devices 720_0 to 720_3 by using the command bus CMD_BUS and the address bus ADD_BUS, and may exchange data with the memory devices 720_0 to 720_3 through the data buses DATA_BUS_0 to DATA_BUS_3. In an implementation of the disclosed technology, the memory controller 710 may be included as a part of a processor such as a Central Processing Unit (CPU), a Graphic Processing Unit (GPU), an Application Processor (AP) and the like. In another implementation, the memory controller 710 may be implemented as a separate chip in a system (e.g., a computing device, a mobile phone, etc.) including the plurality of memory devices 720_0 to 720_3. As described earlier with reference to FIGS. 4 to 6, the memory controller 710 may use a mask command to individually control the plurality of memory devices 720_0 to 720_3. Also, the memory controller 710 may directly transfer data from one memory device to another memory device in the memory module without reading out data to the memory controller 710 in order to write the read-out data into another memory device in the memory module. In an implementation of the disclosed technology, the memory controller 710 may use an internal read command for directing the memory devices 720_0 to 720_3 to perform an internal read operation by using an internal data bus, and may use an internal write command for directing the memory devices 720_0 to 720_3 to perform an internal write operation by using an internal data bus. The internal read/write operations may be controlled by specially defined command signals. Alternatively, the internal read/write operations may be controlled by using normal read/write commands if the memory devices can distinguish these commands from those for normal read/write operations. For example, when a memory device receive read/write commands along with a certain signal that indicates the received read/write commands are for the internal read/write operations, it can internally transfer data between two different memory devices in the memory module via an internal data bus DATA_BUS_INT. The internal read/write operations may include the exchange of data between two memory devices in the memory module, which will be described in detail later with reference to FIGS. 8 to 10.

The plurality of memory devices 720_0 to 720_3 may share the command bus CMD_BUS and the address bus ADD_BUS. Although the memory devices 720_0 to 720_3 receive the same command signals and address signals from the memory controller 710, the memory devices 720_0 to 720_3 may perform individual operations by using a mask command, which is described with reference to FIGS. 4 to 6. The memory devices 720_0 to 720_3 may perform a read operation and a write operation by using the data buses DATA_BUS_0 to DATA_BUS_3 during a normal read operation and a normal write operation, and may perform a read operation and a write operation by using the internal data bus DATA_BUS_INT during an internal read operation and an internal write operation. The internal read operation and the internal write operation will be shown with reference to FIGS. 8 to 10. In an implementation of the disclosed technology, the internal read operation of the memory devices 720_0 to 720_3 may be controlled by the internal read command, and the internal write operation may be controlled by the internal write command. Each of the memory devices 720_0 to 720_3 may be any type of memory device, such as a Dynamic Random Access Memory (DRAM), a Phase Change Random Access Memory (PCRAM), and a flash memory.

In an implementation of the disclosed technology, the internal read command may be a special command signal used to set the internal data bus DATA_BUS_INT as an active data bus that will be used by the memory devices 720_0 to 720_3 when the memory devices 720_0 to 720_3 perform a read operation. The internal write command may be another special command signal used to set the internal data bus DATA_BUS_INT as an active data bus that will be used by the memory devices 720_0 to 720_3 when the memory devices 720_0 to 720_3 perform a write operation. In another implementation of the disclosed technology, the internal read command may be a normal read command that is applied to the memory devices 720_0 to 720_3 after the internal data bus DATA_BUS_INT has been set as an active data bus that is used by the memory devices 720_0 to 720_3. Also, the internal write command may be a normal write command that is applied to the memory devices 720_0 to 720_3 after the internal data bus DATA_BUS_INT has been set as an active data bus that is used by the memory devices 720_0 to 720_3.

Although FIG. 7 shows an example where there are four memory devices 720_0 to 720_3 in the memory module 711, it is obvious to those skilled in the art that the number of the memory devices in the memory module 711 may vary depending on what application the memory module 711 is used for.

Figure 8:
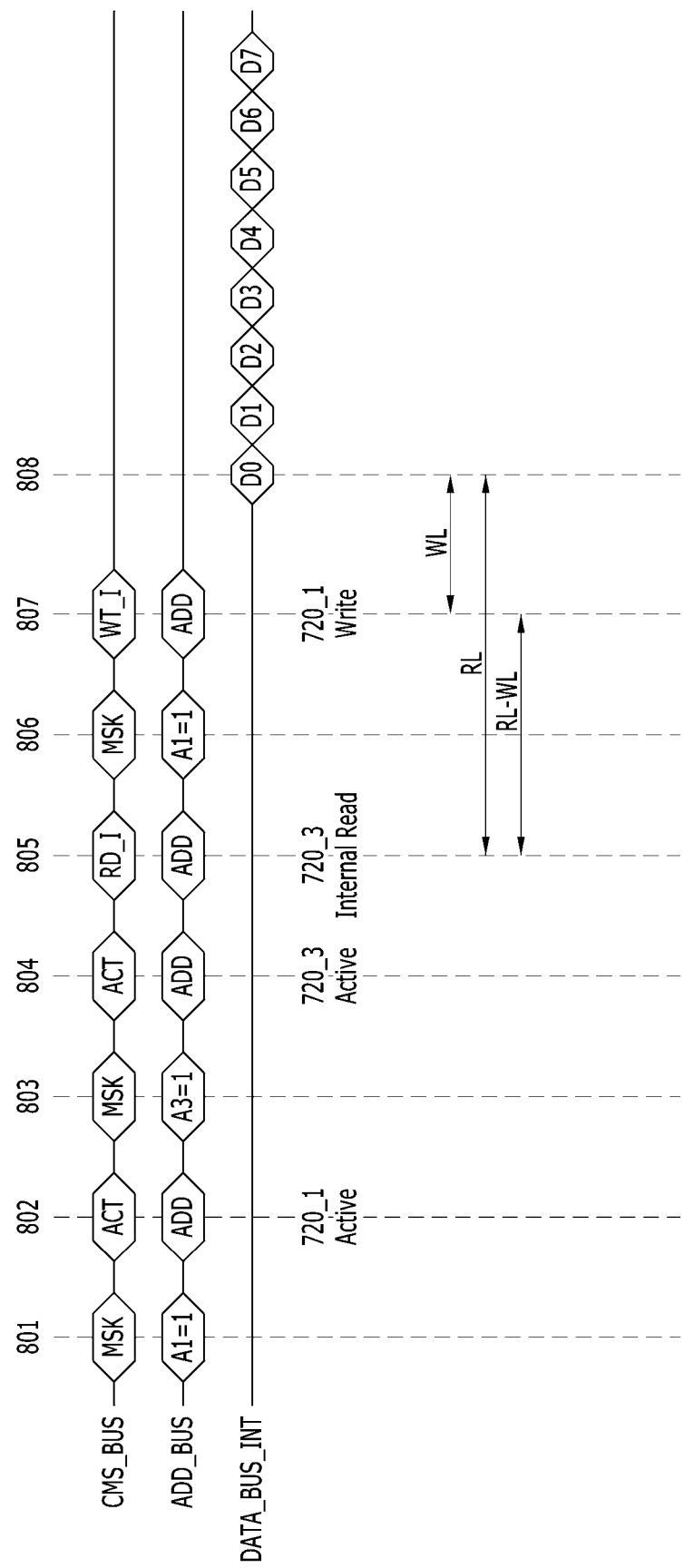
FIG. 8 illustrates an example of a process of exchanging data between memory devices 720_1 and 720_3 in a memory module 711 by using an internal read command and an internal write command in the memory system 700 of FIG. 7 in accordance with an embodiment of the disclosed technology.

FIG. 8 illustrates an example of a process of internally transferring data between memory devices 720_1 and 720_3 in the memory module 711 by using an internal read command and an internal write command in the memory system 700 of FIG. 7 based on an embodiment of the disclosed technology. Prior to the operation shown in FIG. 8, the processes of the steps 411 to 416 shown in FIG. 4 may be performed to set a "valid" signal for individually controlling the memory devices 720_0 to 720_3. Also, before the operation of FIG. 8 is performed, the memory devices 720_0 to 720_3 may perform a normal write operation and a normal read operation.

Referring to FIG. 8, a mask command MSK may be applied from the memory controller 710 to the memory devices 720_0 to 720_3 at a moment 801, and the second normal address A1, which is the valid signal for the memory device 720_1 to be individually activated, may have a value of "1." In this way, the first, third, and fourth memory devices 720_0, 720_2, and 720_3 excluding the second memory device 720_1 may be masked from commands.

An active command ACT may be applied from the memory controller 710 to the memory devices 720_0 to 720_3 at a moment 802, and an address ADD may be applied to select a particular memory location that will become active in response to the active command ACT. In this way, the memory device 720_1 becomes active at 802.

A mask command MSK may be applied from the memory controller 710 to the memory devices 720_0 to 720_3 at a moment 803, and a fourth normal address A3, which is the valid signal for the memory devices 720_3 to be individually activated, may have a value of "1." In this way, the first to third memory devices 720_0 to 720_2 excluding the fourth memory device 720_3 may be masked from commands.

An active command ACT may be applied from the memory controller 710 to the memory devices 720_0 to 720_3 at a moment 804, and an address ADD may be applied to select a particular memory location that will become active in response to the active command ACT. In this way, the fourth memory device 720_3 becomes active at 804.

An internal read command RD_I may be applied from the memory controller 710 to the memory devices 720_0 to 720_3 at a moment 805, and an address ADD may be applied to select a particular memory location on which the internal read operation is performed. In this way, the fourth memory device 720_3 gets ready for the internal read operation. The internal read command RD_I may be distinguished from the normal read command by setting the value of a certain distinguishable address bit (e.g., A14) of the address ADD, which is not used during the read operation, to "1," for example. During the read operation, a smaller number of address bits are used as compared to that in the active operation. For example, normal address signals of 15 bits (e.g., A0 to A14) may be used during an active operation (e.g., a row operation). However, during a read operation and a write operation (e.g., column operations), normal address signals of 10 bits (e.g., A0 to A9) may be used. The internal read command RD_I and the normal read command RD may be distinguished from each other by applying a predetermined voltage (e.g., "1") as the normal address signal A14, which is not used in the read operation.

A mask command MSK may be applied from the memory controller 710 to the memory devices 720_0 to 720_3 at a moment 806, and the second normal address A1, which is the valid signal for the memory devices 720_1 to be individually activated, may have a value of "1." In this way, the first, third, and fourth memory devices 720_0, 720_2 and 720_3 excluding the second memory device 720_1 may be masked from commands.

An internal write command WT_I may be applied from the memory controller 710 to the memory devices 720_0 to 720_3 at a moment 807, and an address ADD may be applied to select a particular memory location on which the internal write operation is performed. In this way, the second memory device 720_1 gets ready for the internal write operation. The internal write command WT_I may be distinguished from the normal write command by setting the value of a certain distinguishable address bit (e.g., A14) of the address ADD, which is not used during the write operation, to "1," for example.

Data may be outputted from the memory device 720_3 to the internal data bus DATA_BUS_INT at a moment 808 when a read latency RL has passed from the moment 805 (when a write latency WL has passed from the moment 807). As an example, FIG. 8 illustrates a timing diagram where eight data bits D0 to D7 are consecutively outputted because a burst length BL is eight "8." Therefore, from the moment 808, the memory device 720_1 may receive and store the data from the internal data bus DATA_BUS_INT. Here, the read latency RL may indicate the time it takes to read the first piece of data out of a desired memory cell after the registration of a read command, and the write latency WL may indicate the time it takes to write the first piece of data into a desired memory cell after the registration of a write command. Those schemes discussed above are based on the fact that the read latency RL is longer than the write latency WL.

To exchange or transfer data between the fourth memory device 720_3 and the second memory device 720_1, an input timing of the data D0 to D7 from the memory device 720_3 to the internal data bus DATA_BUS_INT can be set to coincide with an output timing of the data D0 to D7 from the internal data bus DATA_BUS_INT to the memory device 720_1. Therefore, the internal write command WT_I is applied to the memory device 720_1 at the moment 807 when the time "RL-WL" has passed since the internal read command RD_I was applied to the memory device 720_3 at 805.

As can be seen from FIG. 8, data may be directly transferred between the memory devices 720_1 and 720_3 in the memory module 711 by using the internal data bus DATA_BUS_INT on the memory module 711.

Figure 9:
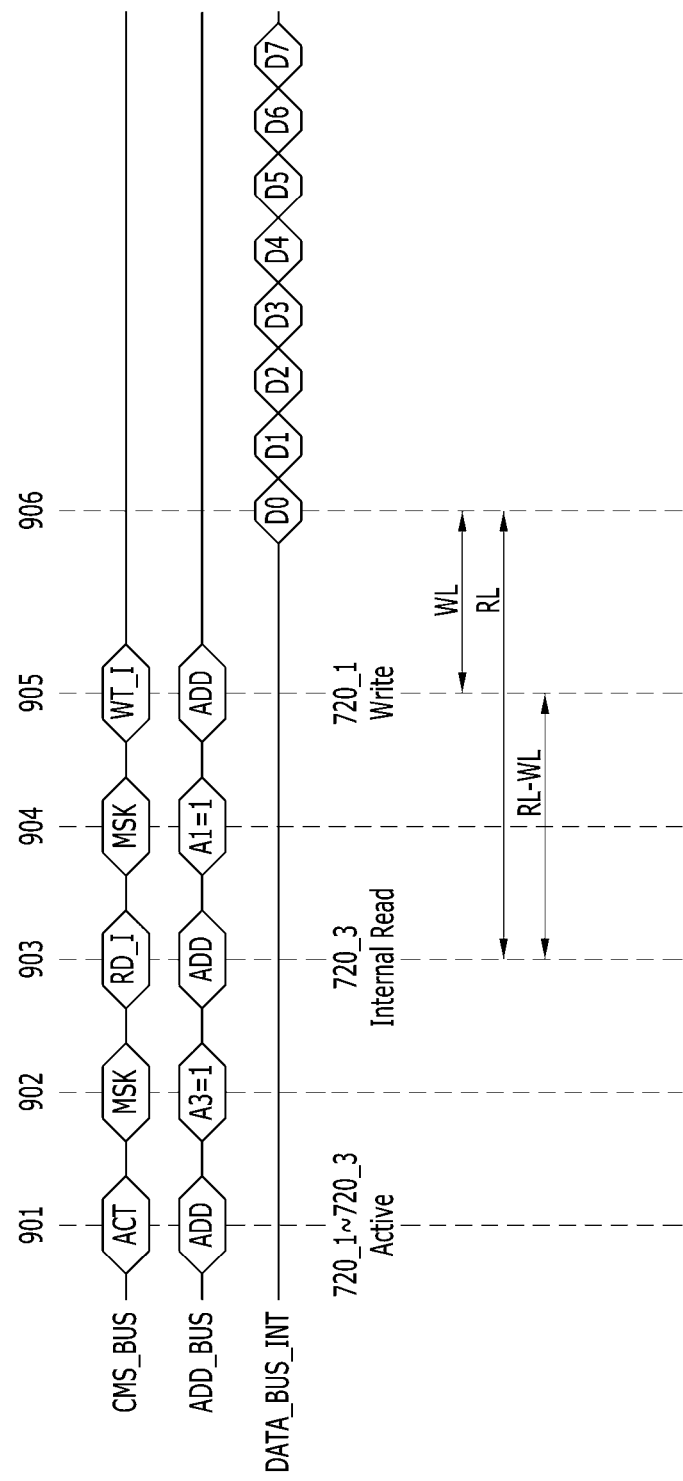
FIG. 9 illustrates an example of a process of exchanging data between memory devices 720_1 and 720_3 in a memory module 711 by using an internal read command and an internal write command in the memory system 700 of FIG. 7 in accordance with another embodiment of the disclosed technology.

FIG. 9 illustrates an example of a process of internally transferring data between memory devices 720_1 and 720_3 in the memory module 711 by using an internal read command and an internal write command in the memory system 700 of FIG. 7 based on another embodiment of the disclosed technology. Prior to the operation shown in FIG. 9, the processes of the steps 411 to 416 shown in FIG. 4 may be performed to set a "valid" signal for individually controlling the memory devices 720_0 to 720_3. Also, before the operation of FIG. 9 is performed, the memory devices 720_0 to 720_3 may perform a normal write operation and a normal read operation.

Referring to FIG. 9, an active command ACT may be given from the memory controller 710 to the memory devices 720_0 to 720_3 at a moment 901, and an address ADD may be applied to select a particular memory location that will become active in response to the active command ACT. In this way, the memory devices 720_0 to 720_3 become active.

A mask command MSK may be applied from the memory controller 710 to the memory devices 720_0 to 720_3 at a moment 902, and a fourth normal address A3, which is the valid signal for the fourth memory devices 720_3 to be individually activated, may have a value of "1." In this way, the first to third memory devices 720_0 to 720_2 excluding the fourth memory device 720_3 may be masked from commands.

An internal read command RD_I may be applied from the memory controller 710 to the memory devices 720_0 to 720_3 at a moment 903, and an address ADD may be applied to select a particular memory location on which the internal read operation is performed. In this way, the fourth memory device 720_3 is now ready for the internal read operation.

A mask command MSK may be applied from the memory controller 710 to the memory devices 720_0 to 720_3 at a moment 904, and the second normal address A1, which is the valid signal for the second memory devices 720_1 to be individually activated, may have a value of "1." In this way, the first, third, and fourth memory devices 720_0, 720_2 and 720_3 excluding the second memory device 720_1 may be masked from commands.

An internal write command WT_I may be applied from the memory controller 710 to the memory devices 720_0 to 720_3 at a moment 905, and an address ADD may be applied to select a particular memory location on which the internal write operation is performed. In this way, the second memory device 720_1 is now ready for the internal write operation.

Data may be outputted from the memory device 720_3 to the internal data bus DATA_BUS_INT at a moment 906 when a read latency RL has passed from the moment 903 (when the write latency WL has passed from the moment 905). Therefore, from the moment 906, the memory device 720_1 may receive and store the data from the internal data bus DATA_BUS_INT.

As can be seen from FIG. 9, the internal write command WT_I is applied to the memory device 720_1 at the moment 905 when the time "RL-WL" has passed since the internal read command RD_I was applied to the memory device 720_3 at 903.

FIG. 9 also shows that the process of simultaneously enabling the memory devices 720_0 to 720_3 and transferring data between the memory devices 720_0 to 720_3 is simpler than the process of FIG. 8. Since the memory devices 720_0 to 720_3 are simultaneously enabled, data may be transferred only in the same row of the memory devices 720_0 to 720_3.

Figure 10:
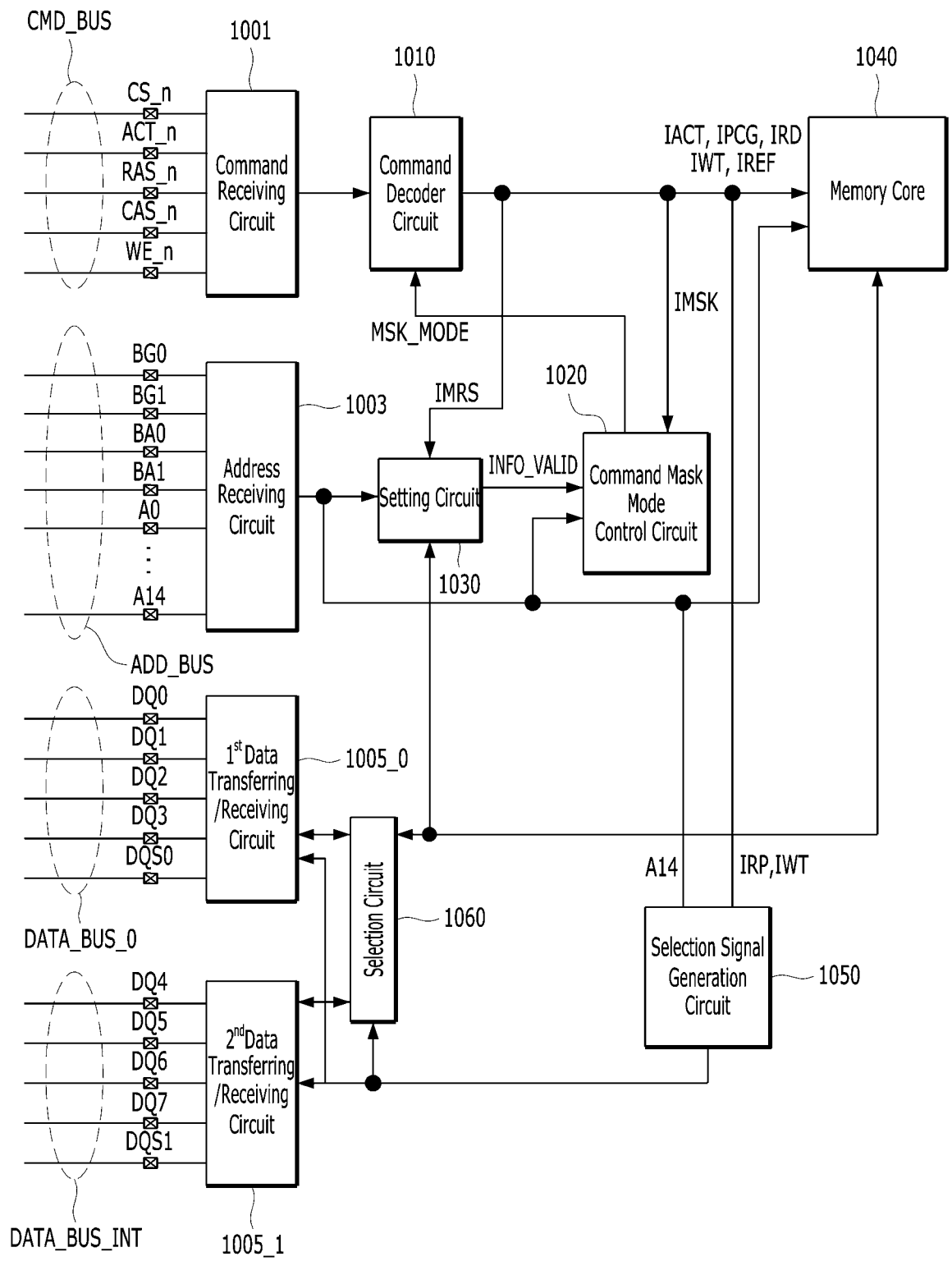
FIG. 10 is a block diagram of an example of a memory device 720_0 shown in FIG. 7.

FIG. 10 is a block diagram of an example of the memory device 720_0 shown in FIG. 7. The memory device 720_0 of FIG. 10 may operate as shown in FIGS. 8 and 9. The memory devices 720_1 to 720_3 of FIG. 7 may also be the same as or similar to those of FIG. 10.

Referring to FIG. 10, the memory device 720_0 may include a command receiving circuit 1001, an address receiving circuit 1003, a first data transferring/receiving circuit 1005_0, a second data transferring/receiving circuit 1005_1, a command decoder circuit 1010, a command mask mode control circuit 1020, a setting circuit 1030, a memory core 1040, a selection signal generation circuit 1050, and a selection circuit 1060.

The command receiving circuit 1001 may receive command signals transferred from the command bus CMD_BUS to the command pads CS_n, ACT_n, RAS_n, CAS_n and WE_n. In the drawing, the command pads CS_n, ACT_n, RAS_n, CAS_n and WE_n are represented by symbols of command signals received by the corresponding pads. For example, "CS_n" may represent a chip selection signal, and "ACT_n" may represent an active signal, and "RAS_n" may represent a row address strobe signal, and "CAS_n" may represent a column address strobe signal.

The address receiving circuit 1003 may receive address signals transferred from the address bus ADD_BUS to address pads BG0, BG1, BA0, BA1, and A0 to A14. In the drawing, the address pads BG0, BG1, BA0, BA1, and A0 to A14 are represented by the symbols of the address signals received by the corresponding pads. To be specific, "BG0" and "BG1" may represent bank group address signals, and "BA0" and "BA1" may represent bank address signals, and "A0" to "A14" may represent address signals.

The first data transferring/receiving circuit 1005_0 may transmit/receive data and data strobe signals via the data bus DATA_BUS_0 through data pads DQ0 to DQ3 and a data strobe signal pad DQS0. The first data transferring/receiving circuit 1005_0 may be enabled during a normal read operation and a normal write operation to transmit/receive data to/from the data bus DATA_BUS_0. The selection signal SEL may be a signal for enabling/disabling the first data transferring/receiving circuit 1005_0, and the first data transferring/receiving circuit 1005_0 may be enabled when the selection signal SEL is disabled.

The second data transferring/receiving circuit 1005_1 may transmit/receive data and data strobe signals with the data bus DATA_BUS_0 through data pads DQ4 to DQ7 and a data strobe signal pad DQS1. The second data transferring/receiving circuit 1005_1 may be enabled during a normal read operation and a normal write operation to transmit/receive data to/from the internal data bus DATA_BUS_INT. The selection signal SEL may be a signal for enabling/disabling the second data transferring/receiving circuit 1005_1, and the second data transferring/receiving circuit 1005_1 may be enabled when the selection signal SEL is enabled.

The selection circuit 1060 may select a data transferring/receiving circuit for transferring/receiving data to/from the memory core 1040 in response to the selection signal SEL. When the selection signal SEL is disabled, the first data transferring/receiving circuit 1005_0 may be selected to exchange data with the memory core 1040. When the selection signal 1060 is enabled, the second data transferring/circuit 1005_1 may be selected to exchange data with the memory core 1040.

The command decoder circuit 1010 may decode the command signals received by the command receiving circuit 1001 to generate internal command signals IACT, IPCG, IRD, IWT, IREF, IMSK and IMRS. The internal command signals IACT, IPCG, IRD, IWT, IREF, IMSK and IMRS may be enabled, when the command signals transferred from the command receiving circuit 1001 have combinations corresponding to the commands. The internal command signals may include an internal active signal IACT, an internal precharge signal IPCG, an internal read signal IRD, an internal write signal IWT, an internal refresh signal IREF, an internal mask signal IMSK, an internal MRS signal IMRS and the like. The command decoder circuit 610 may decode the command signals in a normal mode to enable the internal command signal corresponding to a combination of command signals among the internal command signals IACT, IPCG, IRD, IWT, IREF, IMSK, and IMRS, but may not enable the internal active signal IACT, the internal precharge signal IPCG, the internal read signal IRD, and the internal write signal IWT in a mask mode in which the mask mode signal MSK_MODE is enabled. In other words, in the mask mode, the internal command signals IACT, IPCG, IRD, and IWT corresponding to the masked command may not be enabled. Even in the mask mode, the internal command signals IREF, IMSK, and IMRS corresponding to unmasked commands may be enabled normally.

In response to the enabling of the internal MRS signal IMRS, the setting circuit 1030 may decode an address received by the address receiving circuit 1003 and perform various setting operations. The setting circuit 1030 may receive the entire part of the address received by the address receiving circuit 1003 or may receive only a necessary part of the address. The setting circuit 1030 may receive a portion of the data received by the data transferring/receiving circuit 1005 to detect the voltage level of the data pad DQ0 in the PDA mode. What signal, among the signals the memory device 720_0 receives, will be used to individually activate the memory device 720_0 may be set by the setting circuit 1030, and valid signal information INFO_VALID indicating the signals that are used as the "valid signal" may be provided to the command mask mode control circuit 1020.

When the address signal that is used as the valid signal, among the address signals received by the address receiving circuit 1003, has a value of "1," while the internal mask signal IMSK is enabled, the mask mode control circuit 1020 may control the command decoder circuit 1010 in the normal mode. In other words, the mask mode signal MSK_MODE may be maintained in a disabled state. Also, when the address signal that is used as the valid signal, among the address signals received by the address receiving circuit 1003, has a value of "0," while the internal mask signal IMSK is enabled, the mask mode control circuit 1020 may control the command decoder circuit 1010 in the command mask mode. In other words, the mask mode signal MSK_MODE may be enabled. As described above, the command decoder circuit 1010 may not enable the masked internal command signals IACT, IPCG, IRD and IWT, when the mask mode signal MSK_MODE is enabled.

The memory core 1040 may perform an active operation, a precharge operation, a refresh operation, a read operation, and a write operation, which are main operations of the memory device 720_0. The memory core 1040 may include a cell array, a row circuit for controlling an active operation, a precharge operation and a refresh operation of the cell array, and a column circuit for controlling a read operation and a write operation of the cell array. The memory core 1040 may perform operations corresponding to the enabled internal command signals among the internal command signals IACT, IPCG, IRD, IWT and IREF. The memory core 1040 may receive the address received by the address receiving circuit 1003 to perform an operation requiring an address, such as an active operation, a read operation, a write operation and the like. Also, the memory core 1040 may transfer/receive data through the selected data transferring/receiving circuit among the data transferring/receiving circuits 1005_0 and 1005_1 during the read and write operations.

The selection signal generation circuit 1050 may generate a selection signal SEL in response to the logical level of the address signal A14 among the address signals received by the address reception circuit 1003, when the internal read signal IRD or the internal write signal IWT is enabled. For example, when the address bit A14 has a value of "1" while the internal read signal IRD is enabled, the selection signal SEL may be enabled to "1," and when the address bit A14 has a value of "0" while the internal read signal IRD is enabled, the selection signal SEL may be disabled to "0."

In an embodiment of the disclosed technology, a method of operating a memory module that includes a plurality of memory devices and internal data bus carrying data signals between the plurality of memory devices may include entering a mode that allows the memory module to select a specific memory device out of a group of memory devices that are selected together in read or write operations, activating source memory devices to load data from the source memory devices to the internal data bus, and activating target memory devices to write the data from the internal data bus into the target memory devices. Here, the mode is implemented by using unused address pins of the plurality of memory devices such that each of the plurality of memory devices is selected by one of the unused address pins.

In another embodiment of the disclosed technology, a method of operating a memory module that includes a plurality of memory devices and internal data bus carrying data signals between the plurality of memory devices may include setting mode registers for each of the plurality of memory devices to be individually activated by masking undesired memory devices from being activated, masking the plurality of memory devices except for source memory devices that load data stored therein into the internal data bus, and masking the plurality of memory devices except for target memory devices that store the data.

According to the embodiments of the disclosed technology, data may be directly transferred between the memory devices in the memory module without reading out the data.

While the disclosed technology has been described with respect to the specific embodiments, various changes and modifications may be made based on what is disclosed and illustrated.

What is claimed is:

1. A memory module, comprising:
   a first memory device that includes first circuit nodes for communication with a memory controller and second circuit nodes for communication inside the memory module;
   a second memory device that includes first circuit nodes for communication with the memory controller and second circuit nodes for communication inside the memory module; and
   an internal data bus that couples the first memory device to the second memory device to carry data between the second circuit nodes of the first memory device and the second circuit nodes of the second memory device,
   wherein when an internal read command is applied to the first memory device and an internal write command is applied to the second memory device, data is transferred from the first memory device to the second memory device through the internal data bus,
   wherein a delay between the time at which the internal read command is applied to the first memory device and the time at which the internal write command is applied to the second memory device is obtained by subtracting a write latency (WL) from a read latency (RL); and
   after the write latency (WL) has passed since the internal write command was applied, the data is loaded on the internal data bus from the first memory device and transferred to the second memory device.

2. The memory module of claim 1, further comprising:
   a first data bus that couples the first circuit nodes of the first memory device to the memory controller to carry data between the first circuit nodes of the first memory device and the memory controller; and
   a second data bus suitable that couples the first circuit nodes of the second memory device to the memory controller to carry data between the first circuit nodes of the second memory device and the memory controller.

3. The memory module of claim 1, further comprising:
   a common command bus coupled to and shared by both the first and second memory devices to carry command signals to both the first and second memory devices; and
   a common address bus coupled to and shared by both the first and second memory devices to carry address signals to both the first and second memory devices
   wherein the first memory device and the second memory device are controlled by command signals and address signals provided via the common command bus and the common address bus.

4. The memory module of claim 1, wherein:
   the internal read command sets the second circuit nodes of the first memory device as circuit nodes that are used by the first memory device and directs the first memory device to perform a read operation; and
   the internal write command sets the second circuit nodes of the second memory device as circuit nodes that are used by the second memory device and directs the second memory device to perform a write operation.

5. The memory module of claim 1, wherein:
   the internal read command is a read command that is applied while the second circuit nodes of the first memory device are set as circuit nodes that are used by the first memory device; and the internal write command is a write command that is applied while the second circuit nodes of the second memory device are set as circuit nodes that are used by the second memory device.

6. A memory module, comprising:

a first memory device that includes first circuit nodes for communication with a memory controller and second circuit nodes for communication inside the memory module;

a second memory device that includes first circuit nodes for communication with the memory controller and second circuit nodes for communication inside the memory module; and an internal data bus that couples the first memory device to the second memory device to carry data between the second circuit nodes of the first memory device and the second circuit nodes of the second memory device, wherein when an internal read command is applied to the first memory device and an internal write command is applied to the second memory device, data is transferred from the first memory device to the second memory device through the internal data bus;

a common command bus coupled to and shared by both the first and second memory devices to carry command signals to both the first and second memory devices; and a common address bus coupled to and shared by both the first and second memory devices to carry address signals to both the first and second memory devices, wherein the first memory device and the second memory device are controlled by command signals and address signals provided via the common command bus and the common address bus, and wherein each of the first and second memory devices comprising a command mask mode control circuit to carry out a command mask function on the first and second memory devices, and wherein:

the internal read command applied to the first memory device is recognized as valid only by the first memory device by using the command mask function; and the internal write command applied to the second memory device is recognized as valid only by the second memory device by using the command mask function.

7. A memory module, comprising:

a first memory device that includes first circuit nodes for communication with a memory controller and second circuit nodes for communication inside the memory module;

a second memory device that includes first circuit nodes for communication with the memory controller and second circuit nodes for communication inside the memory module; and an internal data bus that couples the first memory device to the second memory device to carry data between the second circuit nodes of the first memory device and the second circuit nodes of the second memory device, wherein, when an internal read command is applied to the first memory device and an internal write command is applied to the second memory device, data is transferred from the first memory device to the second memory device through the internal data bus, wherein, the internal read command sets the second circuit nodes of the first memory device as circuit nodes that are used by the first memory device and directs the first memory device to perform a read operation; and the internal write command sets the second circuit nodes of the second memory device as circuit nodes that are used by the second memory device and directs the second memory device to perform a write operation, and wherein:

while the internal read command is applied, in order to set the second circuit nodes of the first memory device as the circuit nodes that are used by the first memory device, a control signal is given to the first memory device through an address pad that is not used for a read operation; and while the internal write command is applied, in order to set the second circuit nodes of the second memory device as the circuit nodes that are used by the second memory device, a control signal is given to the second memory device through an address pad that is not used for a write operation.

8. The memory module of claim 7, wherein:

the internal read command sets the second circuit nodes of the first memory device as circuit nodes that are used by the first memory device and directs the first memory device to perform a read operation; and the internal write command sets the second circuit nodes of the second memory device as circuit nodes that are used by the second memory device and directs the second memory device to perform a write operation.

9. The memory module of claim 7, wherein:

the internal read command is a read command that is applied while the second circuit nodes of the first memory device are set as circuit nodes that are used by the first memory device; and the internal write command is a write command that is applied while the second circuit nodes of the second memory device are set as circuit nodes that are used by the second memory device.

10. A memory module, comprising:

a plurality of memory devices;

a plurality of data buses, each of which couples one of the plurality of memory devices to a memory controller to carry data between each of the memory devices and the memory controller;

an internal data bus that couples the plurality of memory devices to each other to carry data between the memory devices;

a common command bus coupled to and shared by the memory devices to direct a common command signal to each of the memory devices to control the memory devices; and a common address bus coupled to and shared by the memory devices to direct a common address signal to each of the memory devices in connection with the common command signal for an operation at each of the memory devices, wherein each of the memory devices includes: first circuit nodes coupled to the data buses to carry data signals; and second circuit nodes coupled to the internal data bus to carry data signals, and wherein when an internal read command is applied to a first memory device among the memory devices through the common command bus and the common address bus and an internal write command is applied to a second memory device, data is transferred between the first memory device and the second memory device through the internal data bus, wherein a delay between the time at which the internal read command is applied to the first memory device and the time at which the internal write command is applied to the second memory device is obtained by subtracting a write latency (WL) from a read latency (RL); and after the write latency (WL) has passed since the internal write command was applied, the data is loaded on the internal data bus from the first memory device and transferred to the second memory device.

11. The memory module of claim 10, wherein each of the first and second memory devices comprising a command mask mode control circuit to carry out a command mask function on the first and second memory devices, and wherein:

the internal read command is recognized as valid only by the first memory device among the memory devices by using a command mask function; and the internal write command is recognized as valid only by the second memory device among the memory devices by using the command mask function.

12. The memory module of claim 10, wherein:

the internal read command sets the second circuit nodes as circuit nodes that carry data signals and are used by the first memory device and directs the first memory device to perform a read operation; and the internal write command sets the second circuit nodes as circuit nodes that carry data signals and are used by the second memory device and directs the second memory device to perform a write operation.

13. The memory module of claim 10, wherein:

the internal read command is a read command that is applied while the second circuit nodes are set as circuit nodes that carry data signals and are used by the first memory device; and the internal write command is a write command that is applied while the second circuit nodes are set as circuit nodes that carry data signals and are used by the second memory device.

14. A method for operating a memory module that includes a first memory device and a second memory device, comprising:

receiving, at the first memory device and the second memory device, a normal read command;

transferring a data from the first memory device to a memory controller through a first memory bus and transferring a data from the second memory device to the memory controller through a second memory bus in response to the normal read command;

receiving a normal write command in the first memory device and the second memory device;

storing the data transferred from the first memory device through the first memory bus and storing the data transferred from the second memory device through the second memory bus in response to the normal write command;

receiving, at the first memory device, an internal read command;

receiving, at the second memory device, an internal write command; and transferring data from the first memory device to an internal data bus in response to the internal read command and transferring the data from the internal data bus to the second memory device in response to the internal write command, wherein a delay between the time at which the first memory device receives the internal read command and the time at which the second memory device receives the internal write command is obtained by subtracting a write latency (WL) from a read latency (RL).

15. The method of claim 14, wherein the transferring of the data from the first memory device to the internal data bus and the transferring of the data from the second memory device to the internal data bus are performed after the write latency WL has passed from the receiving of the internal write command in the second memory device.

16. The method of claim 14, wherein:

the internal read command received by the first memory device is not recognized as valid by the second memory device due to a command masking; and the internal write command received by the second memory device is not recognized as valid by the first memory device due to the command masking.

* * * * *